United States Patent
Saers et al.

(10) Patent No.: US 11,663,857 B2
(45) Date of Patent: May 30, 2023

(54) METHOD AND CONTROL UNIT FOR COMMUNICATING WITH A VEHICLE

(71) Applicant: Scania CV AB, Södertälje (SE)

(72) Inventors: Alexander Saers, Hägersten (SE); Johan Aneros, Huddinge (SE)

(73) Assignee: Scania CVAB, Södertälje (SE)

( * ) Notice: Subject to any disclaimer, the term of this patent is extended or adjusted under 35 U.S.C. 154(b) by 334 days.

(21) Appl. No.: 16/957,357

(22) PCT Filed: Dec. 11, 2018

(86) PCT No.: PCT/SE2018/051276
§ 371 (c)(1),
(2) Date: Jun. 23, 2020

(87) PCT Pub. No.: WO2019/132750
PCT Pub. Date: Jul. 4, 2019

(65) Prior Publication Data
US 2020/0349778 A1    Nov. 5, 2020

(30) Foreign Application Priority Data

Dec. 27, 2017  (SE) .................... 1751649-3

(51) Int. Cl.
*G06F 7/00* (2006.01)
*G07C 5/00* (2006.01)
(Continued)

(52) U.S. Cl.
CPC ............ *G07C 5/008* (2013.01); *G06F 9/541* (2013.01); *H04L 63/123* (2013.01); *H04W 4/44* (2018.02)

(58) Field of Classification Search
CPC .................................................. G07C 5/008
See application file for complete search history.

(56) References Cited

U.S. PATENT DOCUMENTS

| 6,431,875 B1 | 8/2002 | Elliott et al. |
| 7,020,289 B1 | 3/2006 | Riggs |
| | (Continued) | |

FOREIGN PATENT DOCUMENTS

| CN | 1735059 A | 2/2006 |
| CN | 1866386 A | 11/2006 |
| | (Continued) | |

OTHER PUBLICATIONS

Wikipedia, "CAN bus", Dec. 20, 2017, pp. 1-17, https://en.wikipedia.org/w/index.php?title=CAN_bus&oldid=816297918.
(Continued)

*Primary Examiner* — Guang W Li
(74) *Attorney, Agent, or Firm* — Moore & Van Allen PLLC; W. Kevin Ransom

(57) ABSTRACT

Disclosed are methods and control systems for communicating with a vehicle, where the vehicle comprises: a vehicle internal system; an add-on system arranged in the vehicle after manufacture of the vehicle; and an internal communication unit configured for communication with a vehicle external communication unit. The method comprises: configuring an add-on interface, the add-on interface being arranged in said vehicle as an interface between the vehicle internal system and the add-on system, by defining: at least one function of the add-on interface; and at least a signaling format to be used by the internal communication unit for the communication with the vehicle external communication unit; creating an immutable and unique identifier ID related to the configuration of the add-on interface; and communicating, using the internal communication unit and the immutable and unique identifier ID, with the vehicle external communication unit.

16 Claims, 5 Drawing Sheets

(51) Int. Cl.
  *H04W 4/44* (2018.01)
  *G06F 9/54* (2006.01)
  *H04L 9/40* (2022.01)

(56) References Cited

U.S. PATENT DOCUMENTS

| | | | |
|---|---|---|---|
| 7,826,945 | B2 | 11/2010 | Zhang et al. |
| 8,788,715 | B2 | 7/2014 | Krantz et al. |
| 9,453,785 | B2 | 9/2016 | Aneros et al. |
| 10,095,202 | B2 | 10/2018 | Maturana et al. |
| 2003/0046260 | A1 | 3/2003 | Satyanarayanan et al. |
| 2006/0287787 | A1* | 12/2006 | Engstrom ............... G01C 21/26 701/36 |
| 2007/0073908 | A1 | 3/2007 | Gormley |
| 2008/0247576 | A1* | 10/2008 | Marlowe ................ H04N 5/775 |
| 2011/0302190 | A1 | 12/2011 | Young |
| 2013/0293712 | A1 | 11/2013 | Turner et al. |
| 2013/0332844 | A1* | 12/2013 | Rutledge ............... G06F 3/0482 715/744 |
| 2014/0350749 | A1 | 11/2014 | Kwak |
| 2015/0029987 | A1* | 1/2015 | Addepalli ............... G06F 3/017 370/329 |
| 2016/0031389 | A1 | 2/2016 | Grimm et al. |
| 2017/0078398 | A1* | 3/2017 | Haidar .................... H04L 67/53 |
| 2017/0262301 | A1 | 9/2017 | Bai et al. |
| 2019/0385096 | A1* | 12/2019 | Ibrahim ............... G06Q 20/325 |
| 2020/0108840 | A1* | 4/2020 | Andres ................ B60W 40/09 |
| 2020/0349778 | A1* | 11/2020 | Saers ...................... G07C 5/008 |
| 2022/0207022 | A1* | 6/2022 | Wood ................. G06F 16/2379 |

FOREIGN PATENT DOCUMENTS

| | | |
|---|---|---|
| CN | 1920946 A | 2/2007 |
| CN | 103946681 A | 7/2014 |
| CN | 104950741 A | 9/2015 |
| WO | 9936297 A1 | 7/1999 |
| WO | 03029922 A2 | 4/2003 |
| WO | 2016014966 A2 | 1/2016 |
| WO | 2016147149 A1 | 9/2016 |
| WO | 2016160144 A1 | 10/2016 |

OTHER PUBLICATIONS

Scania CV AB, European Patent Application No. 18895363.2, Extended European Search Report, dated Aug. 16, 2021.
Scania CV AB, Korean Patent Application No. 10-2020-7020589, Office Action, dated Jul. 28, 2021.
Scania CV AB, International Application No. PCT/SE2018/051276, International Search Report, dated Mar. 25, 2019.
Scania CV AB, International Application No. PCT/SE2018/051276, Written Opinion, dated Mar. 25, 2019.
Scania CV AB, Swedish Application No. 1751649-3, Office Action, dated Sep. 11, 2018.
Scania CV AB, International Application No. PCT/SE2018/051276, International Preliminary Report on Patentability, dated Jun. 30, 2020.
Scania CV AB, Chinese Patent Application No. 201880081559.8, First Office Action, dated Aug. 3, 2022.

* cited by examiner

METHOD AND CONTROL UNIT FOR COMMUNICATING WITH A VEHICLE

CROSS-REFERENCE TO RELATED APPLICATIONS

This application is a national stage application (filed under 35 § U.S.C. 371) of PCT/SE2018/051276, filed Dec. 11, 2018 of the same title, which, in turn, claims priority to Swedish Application No 1751649-3 filed Dec. 27, 2017; the contents of each of which are hereby incorporated by reference.

FIELD OF THE INVENTION

The present invention relates to a method for communicating with a vehicle. The present invention also relates to a control unit arranged for communicating with a vehicle. The present invention also relates to a computer program and a computer-readable medium comprising instructions for carrying out the method according to the invention.

BACKGROUND OF THE INVENTION

The following background information is a description of the background of the present invention, which thus not necessarily has to be a description of prior art.

Vehicle manufacture may be conducted in a variety of ways. In for example the car industry, the manufacturer usually produces vehicles that are complete and intended for direct delivery to final customers.

The heavy vehicle industry, however, commonly also employs other kinds of production methods. Manufacturers of heavy vehicles may, as in the car industry, produce vehicles intended for delivery directly to final customers or final users of the vehicles. However, it is also common that heavy vehicles produced by the manufacturer are only partly manufactured, i.e. are only completed to a certain extent, including vehicle internal systems, in view of being subsequently completed by another part than the manufacturer, for example a user or a customer of the manufacturer, e.g. a third-party supplier, in such a way as to meet specific requirements of the final customers or users.

It may also be that the vehicle, although substantially completed by its manufacturer, will be provided with further functionalities and/or systems, in this document denoted add-on systems, e.g. by another party such as a third-party supplier, a customer, or a final user, before it is put into use. It is for example usual that commercial vehicle manufacturers, as well as producing fully equipped vehicles, produce also vehicle versions being only partly manufactured, for example intentionally comprising only the chassis, or the chassis and the driver compartment/cab. The partially manufactured vehicle is then intended to be subsequently completed with one or more additional systems and/or functionalities by another party than the manufacturer, in accordance with the specific requirements of the another party, being e.g. a final customer and/or final user.

For example, chassis produced by a vehicle manufacturer may be designed to be usable in any desired way as bases for building on in order to construct mobile homes, fire vehicles, ambulances, concrete mixer trucks, refrigerated vehicles, or any other especially adapted vehicle. Also, for example a bus chassis may be produced by the vehicle manufacturer with little or no bodywork, with the intention to complete the vehicle with subsequent building-on performed by a bus bodybuilder. Generally, a bodybuilder installs/adds one or more add-on systems, i.e. does bodywork, on a vehicle after its original manufacture.

Thus, the building-on and/or addition of one or more systems and/or functionalities carried out by another party may be very extensive, and at least some building-on is also very common in the case of heavy vehicles. For this reason, the vehicle manufacturer often also prepares the vehicle in such a way as to facilitate subsequent building-on.

For example, one or more power takeoffs are often included in the vehicle by the manufacturer, e.g. so that add-on systems may be connected for example to the vehicle's engine and/or gearbox to enable them to be provided with driving power from the vehicle. There may also be connections to make it possible to use, for example, the vehicle's electrical system, hydraulic system and/or pneumatic system for implementation of add-on functions. A vehicle may thus be provided with a plurality of power takeoffs, and the power takeoff requirement may vary depending on the kinds of applications built onto the vehicle. Certain applications may for example require power which is constantly available when the engine of the vehicle is running, irrespective of whether the vehicle is moving or not, e.g. in the case of concrete mixer trucks, refrigeration units in refrigerated vehicles. Other applications may only need power on distinct occasions, e.g. upon activation of an additional system. The activation of a power takeoff for, and hence activation of the operation of, one or more built-on systems and/or functionalities is often not such that continuous or unregulated power takeoff is desirable, since it is only usually required in certain situations, e.g. upon a demand from the built-on systems and/or functionalities themselves or from, for example, the vehicle's driver.

SUMMARY OF THE INVENTION

A flexible add-on interface, handling one or more add-on systems, may be updated/adapted/adjusted/reconfigured after manufacture of the vehicle. Add-on systems may be added to the vehicle by e.g. a final user and/or a customer. The one or more add-on systems being implemented in the vehicle are therefore often unknown for vehicle internal systems and/or for off-board systems wishing to communicate with the add-on systems via the add-on interface. It may thus be problematic for the vehicle internal systems and/or for the off-boards systems to communicate with the add-on systems. Especially, the vehicle internal systems and/or the off-boards systems may be unable to interpret information being provided/sent to them from the one or more add-on systems.

It is therefore an object to solve at least some of the above-mentioned disadvantages.

The object is achieved by a method for communicating with a vehicle, where the vehicle includes:

at least one vehicle internal system;

at least one add-on system, the add-on system being arranged in the vehicle after the vehicle is produced by a manufacturer; and at least one internal communication unit arranged for communication with at least one vehicle external communication unit.

The method includes:

configuring an add-on interface, the add-on interface being arranged in said vehicle as an interface between the at least one vehicle internal system and the at least one add-on system, by defining: at least one function of the add-on interface; and at least a signaling format to be used by the at least one internal communication unit for the communication with the at least one vehicle external communication unit;

creating, an immutable and unique identifier ID related to the configuration of the add-on interface; and communicating, by usage of the at least one internal communication unit and the immutable and unique identifier ID, with the at least one vehicle external communication unit.

By creating and communicating immutable and unique identifiers IDs coupled to the specific configuration of the add-on interface, knowledge of the specific add-on interface configuration may be distributed to entities communicating with the add-on interface. Hereby, the entities being provided with the immutable and unique identifiers IDs, and thus with the definitions used for the configuration of the add-on interface, are able to receive, detect and/or process information transferred to them from the add-on interface. The immutable and unique identifiers IDs may also be utilized as a kind of packet header, indicating a system and/or an associated add-on interface configuration to which a packet and its information is related/intended. Of course, information related to any of the at least one vehicle internal system may also be provided to the offboard entities mentioned in this document, by usage of the at least one internal communication unit, the at least one external communication unit and the immutable and unique identifier ID. Thus, normal vehicle data, e.g. related to speed, vehicle speed, or any other relevant vehicle condition, may hereby be transferred offboard.

Thus, based on the immutable and unique identifiers IDs, detection, reception, interpretation and/or processing of information transmitted from the add-on systems and/or vehicle internal systems included in the vehicle may be reliably performed in essentially any entity to which the information is sent. Also, the immutable and unique identifiers IDs may be used for identifying specific one or more add-on and/or vehicle internal systems to which information from one or more offboard entities is to be provided, such that the information may be transferred to the right add-on and/or vehicle internal system.

By usage of the present invention, a reliable and safe communication is established between essentially any offboard entity and one or more add-on and/or vehicle internal systems included in a vehicle, although the one or more add-on systems may be at least partly unknown for the offboard entities.

Since the usage of the immutable and unique identifiers IDs secures that communication will be possible between essentially any offboard entity/system and the add-on and/or vehicle internal systems, add-on systems may be flexibly added to the vehicle, and the add-on interface may be easily updated/configured based on configuration information provided by a number of sources. Essentially, anyone with knowledge of the add-on systems may be able to update the add-on interface, e.g. by a parameter based update of the add-on interface features and/or functionalities, when an add-on system is added to the vehicle, wherefore the vehicle does not have to go to the workshop for the update/configuration. The vehicle off road time and the update costs are hereby greatly reduced.

By way of embodiments of the present invention, the addition of an add-on system to the vehicle is facilitated.

According to an embodiment of the present invention, the communicating includes:

arranging vehicle related information in one or more packets in accordance with the signaling format;

adding the immutable and unique identifier ID to each one of the one or more packets; and transmitting the one or more packets to the at least one vehicle external communication unit.

Thus, the immutable and unique identifier ID is here added to the packets, and may be used as a packet header. The immutable and unique identifier ID may thus be used by an entity receiving the packets for identifying the configuration of the add-on system and/or add-on interface from which the packets are originating, and the signaling format of the packet. Hereby, the receiving entity may be able to detect, receive, interpret and/or process the information included in the packets.

According to an embodiment of the present invention, the communicating includes: transmitting the immutable and unique identifier ID and information related to a corresponding configuration of the add-on interface to the at least one vehicle external communication unit.

The immutable and unique identifiers IDs and information related to the corresponding add-on interface configuration may be sent separately, i.e. without any further information from the add-on systems, to essentially any off-board entity. The immutable and unique identifiers IDs, and the information related to the corresponding add-on interface configuration may then be stored in the offboard entity to later be used when information from one or more add-on system is sent offboard. Thus, the previously stored immutable and unique identifiers IDs and/or add-on interface configuration information may by fetched and used when receiving/detecting/interpreting/processing later provided information from the add-on systems. Also, the previously stored immutable and unique identifiers IDs may be fetched and added to packets sent from the offboard entities to the one or more add-on systems.

According to an embodiment of the present invention, the method includes for each one of the one or more packets:

receiving the packet from the at least one vehicle external communication unit;

detecting the immutable and unique identifier ID for the packet;

determining, based on the detected immutable and unique identifier ID for the packet: to which system the packet is related; and how the information in the packet should be interpreted;

detecting, based on the determined interpretation, vehicle related information included in the packet.

Thus, when data/information packets including vehicle related information is transmitted from one or more offboard entities to one or more add-on and/or vehicle internal systems, the immutable and unique identifier ID are useful as identifiers of the one or more add-on and/or vehicle internal systems for which the packets are intended, and are also useful for indicating how the information included in the packets should be interpreted. Hereby, vehicle related information sent from any offboard entity is safely guided/provided to the intended recipient add-on and/or vehicle internal system, in which the information will be correctly received. The information may here be decoded, such that the information when it reaches the recipient add-on and/or vehicle internal system is on the same, or a corresponding, format on which it was inputted e.g. by use of an add-on interface configuration tool, a manufacturer interface entity, a client/user interface entity and/or a diagnosis entity. The decoding may be performed e.g. by the add-on interface. Thus, the information is provided to the recipient add-on system on a structured format usable by the recipient add-on system.

According to an embodiment of the present invention, the at least one vehicle external communication unit is included in one or more of:

an add-on interface configuration tool arranged for handling the configuration of the add-on interface; and a register storing one or more of the immutable and unique identifiers ID and information related to one or more corresponding configurations of the add-on interface, respectively.

The least one vehicle external communication unit may be included in essentially any offboard entity. One example of such an offboard entity is an add-on interface configuration tool, whereby the immutable and unique identifiers IDs are then sent to, and being stored in, the add-on interface configuration tool when being created. The add-on interface configuration tool may then safely and reliably communicate with the one or more add-on and/or vehicle internal systems. One other example of such an offboard entity is a register, being essentially any entity with storage capabilities, such as a memory, a database, a server, a computer, a processor or the like, being arranged for storing immutable and unique identifiers IDs and providing immutable and unique identifiers IDs to other entities requiring/requesting them.

According to an embodiment of the present invention, one immutable and unique identifier ID is created for each specific configuration of the add-on interface.

Hereby, each immutable and unique identifier ID indicates a specific/separate/distinct configuration of the add-on interface, which provides for a reliable and safe detection/reception/interpretation/processing of information provided e.g. by the add-on systems.

According to an embodiment of the present invention, the creating of the immutable and unique identifier ID includes generating of a universally unique identifier (UUID) and/or a globally unique identifier (GUID).

Usage of universally unique identifiers (UUIDs) and/or globally unique identifiers (GUIDs) secures that the identifiers are truly unique, which increases the reliability of the information transfer between offboard entities and the add-on and/or vehicle internal systems.

According to an embodiment of the present invention, the definition of the at least one function of the add-on interface and of the at least a signaling format is based on input provided by one or more of:

a final user of the vehicle;

at least one other part than the manufacturer, the at least one other part having knowledge of the at least one add-on system; and the manufacturer.

Thus, the add-on interface may be flexibly updated/configured based on configuration information provided by a number of sources. Essentially anyone with knowledge of the add-on systems and its related signaling reception and/or processing capabilities may be able to update the add-on interface, e.g. by the above-mentioned parameter update, wherefore the vehicle does not have to go to the workshop for the update/configuration. The vehicle off road time and the update costs are hereby greatly reduced The object is also achieved by the above-mentioned control unit arranged for communicating with a vehicle, the vehicle including:

at least one vehicle internal system;

at least one add-on system, the add-on system being arranged in the vehicle after the vehicle is produced by a manufacturer; and at least one internal communication unit arranged for communication with at least one vehicle external communication unit.

The control unit is arranged for:

configuring an add-on interface, the add-on interface being arranged in said vehicle as an interface between the at least one vehicle internal system and the at least one add-on system, by defining: at least one function of the add-on interface; and at least a signaling format to be used by the at least one internal communication unit for the communication with the at least one vehicle external communication unit;

creating, an immutable and unique identifier ID related to the configuration of the add-on interface; and communicating, by usage of the at least one internal communication unit and the immutable and unique identifier ID, with the at least one vehicle external communication unit.

The control unit has advantages corresponding to the ones mentioned above for the method.

The object is also achieved by the above-mentioned computer program and computer-readable medium.

Detailed exemplary embodiments and advantages of the method, control system, computer program and computer-readable medium according to the invention will below be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF THE INVENTION

Figure 1:
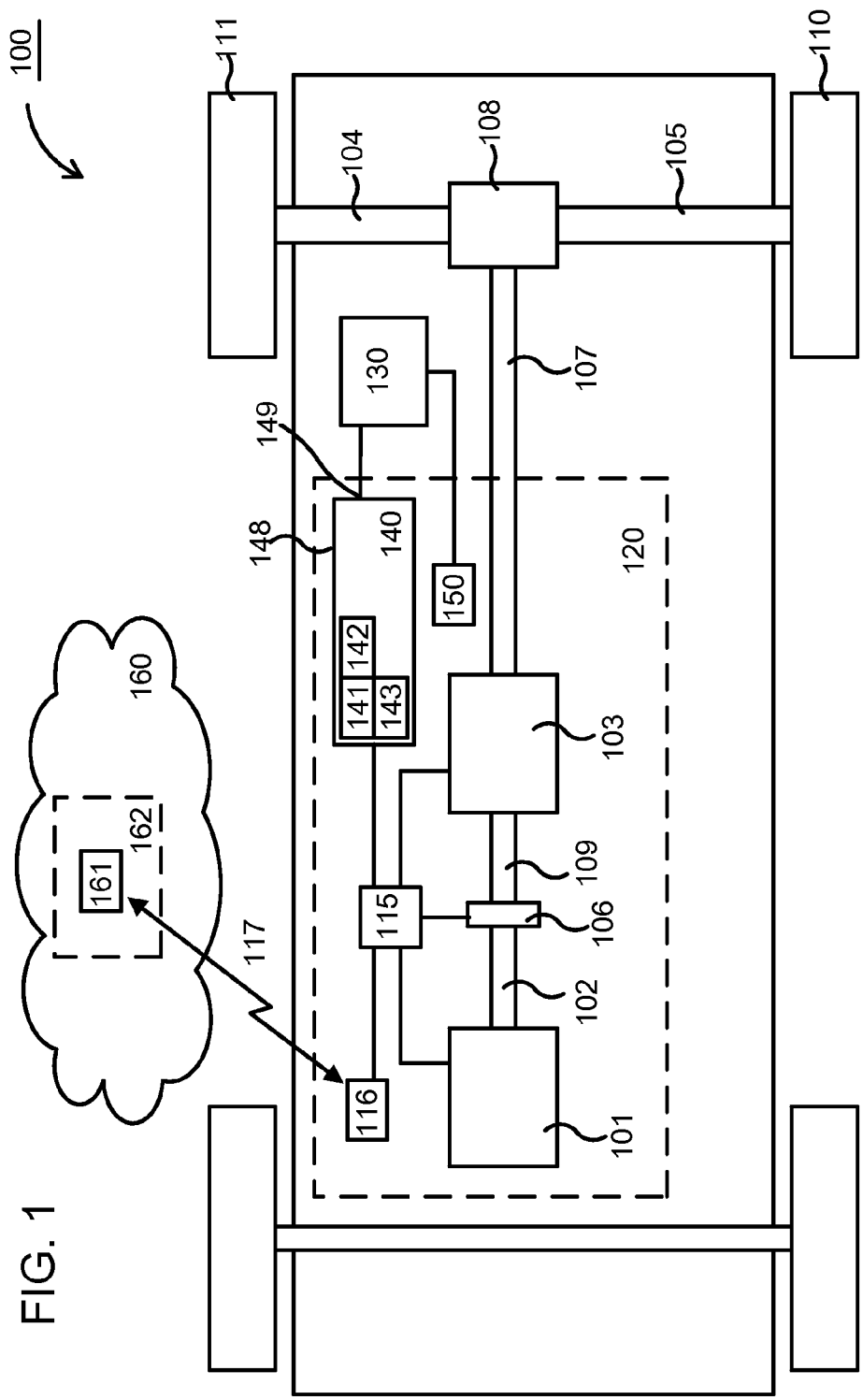
FIG. 1 is a schematic illustration of a non-limiting example of a vehicle in which the embodiments of the present invention may be implemented.

FIG. 1 schematically illustrates a power train in a vehicle 100, in which the embodiments of the present invention may be implemented. The illustrated vehicle 100 has only one axle 104, 105 with tractive/drive wheels 110, 111, but the invention is also applicable to vehicles which have more than one axle provided with tractive wheels. The power train comprises a combustion engine 101 which in a conventional way, via an output shaft 102 of the engine, usually via a flywheel, is connected to a gearbox 103 via a clutch 106 and an input shaft 109 connected to the gearbox 103.

The engine may be controlled by the vehicle's control system via a control unit 115. The clutch 106, which may for example take the form of an automatically controlled clutch, and/or the gearbox 103, which may for example be a conventional automatic gearbox, may also be controlled by means of one or more suitable control units, generally depicted as the control unit 115 in FIG. 1. Thus, the function of the control unit 115 may be provided by two or more control units, as is mentioned more in detail below.

The vehicle 100 may further include at least one internal communication unit 116, being associated/connected to one or more control units 115 of the vehicle. For example, the at least one internal communication unit 116 may be included in a control system network of the vehicle 100. The control system network may, as is described below, essentially include any suitable communication interface facilitating communication between control units/devices/entities in the vehicle 100. For example, the communication interface connects the one or more vehicle internal systems 120 with each other, including connecting the at least one internal communication unit 116 with the control unit 115 and other internal systems 120 of the vehicle 100. Such a communication interface many for example, include a controller area network (CAN), an Ethernet connection, a Flexray bus, a local interconnect network (LIN) bus and/or a WiFi connection.

The at least one internal communication unit 116 is arranged for communication with at least one vehicle external communication unit 161, i.e. arranged for transmitting information to and/or receiving information from the at least one vehicle external communication unit 161. The at least one vehicle external communication unit 161 is arranged outside of the vehicle 100, and may be included in and/or associated/connected to essentially any suitable external device/node/apparatus/entity 162, such as e.g. at least one web and/or internet related unit, at least one internet cloud 160 related unit, at least one infrastructure unit, at least one external communication entity included in at least one other vehicle, at least one server and/or at least one database. The at least one vehicle external communication unit 161 may also be included in and/or associated/connected to essentially one or more of the units/devices/entities 411, 412, 413, 141, 420, 430, 440 of an add-on/bodybuilder network 410, as is described more in detail below.

The communication between the at least one internal 116 and at least one external 161 communication units may be performed by usage of a wireless connection 117, e.g. a connection working according to essentially any suitable wireless standard, specification and/or protocol, such as according to the Global System for Mobile communications (GSM) standard, the General Packet Radio Service (GPRS) standard, the Bluetooth standard, any suitable wireless local area networking (WiFi) standard, any suitable generation of a broadband cellular technology (3G, LTE, 4G, 5G) standard, and/or any other suitable wireless standard. Alternatively, the connection 117 may also be a wired connection, including usage of at least one cable or other wiring equipment.

As illustrated in FIG. 1, an output shaft 107 from the gearbox 103 drives the tractive wheels 110, 111 via a final gear 108, e.g. a conventional differential, and driveshafts 104, 105 which are connected to the final gear.

The engine 101, the clutch 106 and the gearbox 103 may be examples of vehicle internal systems 120. As is understood by a skilled person, the vehicle may include a large number of such vehicle internal systems 120, i.e. systems arranged in the vehicle 100 when it was produced by the manufacturer.

In this document, parts, systems and/or functionalities being included/arranged in the vehicle already at vehicle manufacture/production by the manufacturer is commonly denoted vehicle internal system 120. Correspondingly, parts, systems and/or functionalities being included/arranged in the vehicle after the manufacture/production by the manufacturer is commonly denoted add-on systems 130 in this document. The manufacturer is in this document defined as a producer of the original/initial vehicle, being partly completed with at least one vehicle internal system 120 but lacking the later added at least one add-on system 130. The manufacturer of the partly completed vehicle may also be denoted as original equipment manufacturer (OEM). The one or more add-on systems 130 may be provided by another party, which in this document means a party which may be another and/or independent of the vehicle manufacturer, and to which a vehicle produced by the vehicle manufacturer is directly or indirectly delivered after being manufactured/produced. Thus, the other party may be a customer or a final user, but may also be a third-party supplier, which carries out building-on, i.e. addition of one or more add-on systems 130, before delivery to a final customer.

It should be noted that the vehicle depicted in FIG. 1 is merely one example of how the vehicle might be configured, as the embodiments of the invention are applicable to all types of vehicles, e.g. those with hybrid power trains, electric vehicles and/or other kinds of axle configurations, other types of gearboxes with or without clutches etc.

The one or more add-on systems 130 illustrated in FIG. 1 may be provided with power form one or more takeoffs 150, which may be situated at various locations in the vehicle 100.

The one or more add-on systems 130 may be of various kinds, e.g. one might comprise activation of a crane function via a power takeoff, whereas another might comprise illumination of a certain warning lamp at the vehicle driver's location. Thus, the one or more add-on systems 130 may be of a simple kind, i.e. have a low complexity, but may also have substantially any desired functionality, and thus also any complexity.

The one or more add-on systems 130 may need, i.e. may have a demand for, power to be provided to the add-on systems 130. The one or more add-on systems 130 may also need, i.e. may have a demand for, being able to communicate with an internal control system of the vehicle, in order to be provided with one or more signals, parameters and/or control signals available in the internal control system, and/or to be able to provide one or more signals, parameters and/or control signals to the one or more vehicle internal systems 120 via the vehicle internal control system. The one or more add-on systems 130 may also need, i.e. may have a demand for, being able to communicate with one or more nodes/devices/entities/equipment external from the vehicle.

Power needed by the one or more add-on systems 130 may e.g. be provided by the above mentioned one or more power takeoffs 150 and/or may be provided by an add-on interface 140 arranged for providing communication between the one or more vehicle internal systems 120 and the one or more add-on systems 130. The communication between the one or more vehicle internal systems 120 and the one or more add-on systems 130 is facilitated by the add-on interface 140. Thus, the add-on interface communicates one or more signals, parameters and/or control signals between the one or more vehicle internal systems 120 and the one or more add-on systems 130. Thus, the add-on interface 140 is provided as a general interface between the at least one vehicle internal system 120 and the at least one add-on system 130. The add-on interface includes one or more inputs/outputs, for example input/output pins, to which systems, such as e.g. add-on systems, may be connected. Via these inputs/outputs, signals are received/transmitted to the systems connected to the add-on interface 140. For example, the one or more add-on systems may be connected to one or more inputs of the add-on interface, and may provide signals of any suitable signaling format, which is often related to the specific add-on system providing the signal, to the one or more inputs. Essentially, any signaling format mentioned in this document may be received at the one or more inputs. Correspondingly, signals may also be output on the one or more outputs of the add-on interface 140, on a suitable signaling format.

As mentioned above, the at least one internal communication unit 116, and also other vehicle internal system 120, may be included in a control system network of the vehicle 100, which may include the above-mentioned communication interface connecting the one or more vehicle internal systems 120 with each other. Such a communication interface many for example, include a controller area network (CAN), an Ethernet connection, a Flexray bus, a local interconnect network (LIN) bus and/or a WiFi connection. Such a communication interface may be generally used for connecting units/devices/entities/interfaces in the vehicle 100, such as connecting the add-on systems 130 to the add-on interface 140. The at least one add-on system 130 may be connected to an external control system network input, e.g. an external controller area network (CAN) input 149, of an interface/control unit 148 including the add-on interface 140. Hereby, a connection between the one or more add-on systems 130 and the communication interface, such as e.g. the controller area network (CAN), is provided, which is used for connecting the one or more add-on systems 130 to the one or more vehicle internal systems 120, via the communication interface, e.g. via the controller area network (CAN).

Thus, the one or more add-on systems 130 may need/use various information to be provided to them, from within the vehicle and/or from outside of the vehicle, and may therefore have a demand for communication abilities. The one or more add-on systems 130 may also demand resources from the vehicle, such as e.g. status signals from the vehicle, i.e. the signal state of appropriate outputs of the interface/control unit 148 including/implementing the add-on interface 140. The resources which the one or more add-on systems demand for their functions may for example take the form of a demand for mechanical power, electric power, hydraulic power and/or pneumatic power, and/or may take the form of a demand for at least one signal and/or at least one function of the control system of the vehicle. Normally, a demanded power, requiring activation of a power takeoff 150 has to be demanded from the internal control system of the vehicle 100. Where resources are demanded, they are often not constantly demanded, and are also often not constantly available.

Vehicle manufacturers are reluctant for some other party, e.g. a third-party supplier, to effect changes directly in the internal control system of the vehicle, since this may affect the performance of the vehicle in ways which are both undesirable and difficult to predict. This is also why the vehicle manufacturer provides the add-on interface 140, i.e. a signaling interface which can be used for an add-on system for communication with the internal control system of the vehicle.

The add-on interface 140 may be of various kinds, and may include a number of inputs and outputs, which each may have a certain function assigned to it. One output might for example represent activation of a vehicle internal system 120, e.g. a parking brake activation, and when the parking brake is applied this output might for example be set to a high level, in order thereby to communicate the activation of the internal system, e.g. the parking brake, to the one or more add-on systems 130. As is understood by a skilled person, a large number of other examples of functions, whose status may be signaled in a similar way, may be provided by the add-on interface 140. These signals may then be used by the one or more add-on systems 130, but subject for example to various conditions which usually have to be fulfilled for a certain function to be activated.

Thus, by the add-on interface 140, the vehicle manufacturer may provide a building-on interface to enable communication between the internal systems 120 and the add-on system 130. The add-on interface 140 may for example comprise one or more terminal blocks having a number of inputs/outputs, such that high/low/numerical signals on an output may for example represent a status of a certain function, and this information may be used as a control signal for conditional control of add-on system functions. There may also be inputs, e.g. for conveying from the add-on systems 130 signaling, e.g. such that inputting a high signal level on a certain input indicates a demand for activation of a function having a defined meaning.

As a given chassis configuration may be used for add-on systems within a large number of areas of application, it is often not possible at vehicle manufacturing stage to know the specific intended use of a specific chassis, still less the characteristics of specific add-on systems 130. Thus, the add-on systems may communicate their status, e.g. whether the function is active or inactive, by applying a voltage to an input on the add-on interface 140, which will be communicated further to the internal control system and/or vehicle internal systems 120 by the add-on interface 140. The internal communication system and/or the vehicle internal systems 120 will thus also be aware that add-on systems 130 exist and their status.

Control systems in modern vehicles usually comprise a communication bus system comprising of one or more communication buses arranged for connecting together a number of electronic control units (ECUs), e.g. the control units, or controllers, and various systems/components/devices on board the vehicle. Such a control system may comprise a large number of control units and the responsibility for a specific function may be spread over more than one of them.

For sake of simplicity, FIG. 1 shows only some such control units 115, 140. However, parts of the present invention may be implemented in any suitable control unit, e.g. the control units 115, 140, or wholly or partly in one or more other control units on board the vehicle 100. Control units of the kind depicted are normally adapted to receiving sensor signals from various parts and/or control units of the vehicle. Control units are also usually adapted to delivering control signals to various parts and components of the vehicle, e.g. the control units 115, 140 may deliver signals to suitable actuators for activation of power takeoffs and/or for activation of other vehicle internal systems 120.

The control unit 115 is in FIG. 1 schematically illustrated as receiving signals and/or providing control signals from and/or to the engine 101, the clutch 106 and/or the gearbox 103. The control system 120 may, also receive and/or provide control signals to and/or from other internal systems/devices 120 in the vehicle 100.

According to some embodiments of the present invention, as described in this document, the interface control unit 148 including the add-on interface 140 may comprise configuration 141 arranged for configuring the add-on interface 140, e.g. a configuration unit 141, creation means 142 arranged for creating immutable and unique identifiers IDs, e.g. a creation unit 142, and communication means 143 arranged for communicating the immutable and unique identifiers IDs, e.g. a communication unit 143. These control means/units/devices 141, 142, 143, are described more in detail below, and may be divided physically into more entities than the herein described interface control unit 148, or may be arranged in less entities than herein described.

Figure 2:
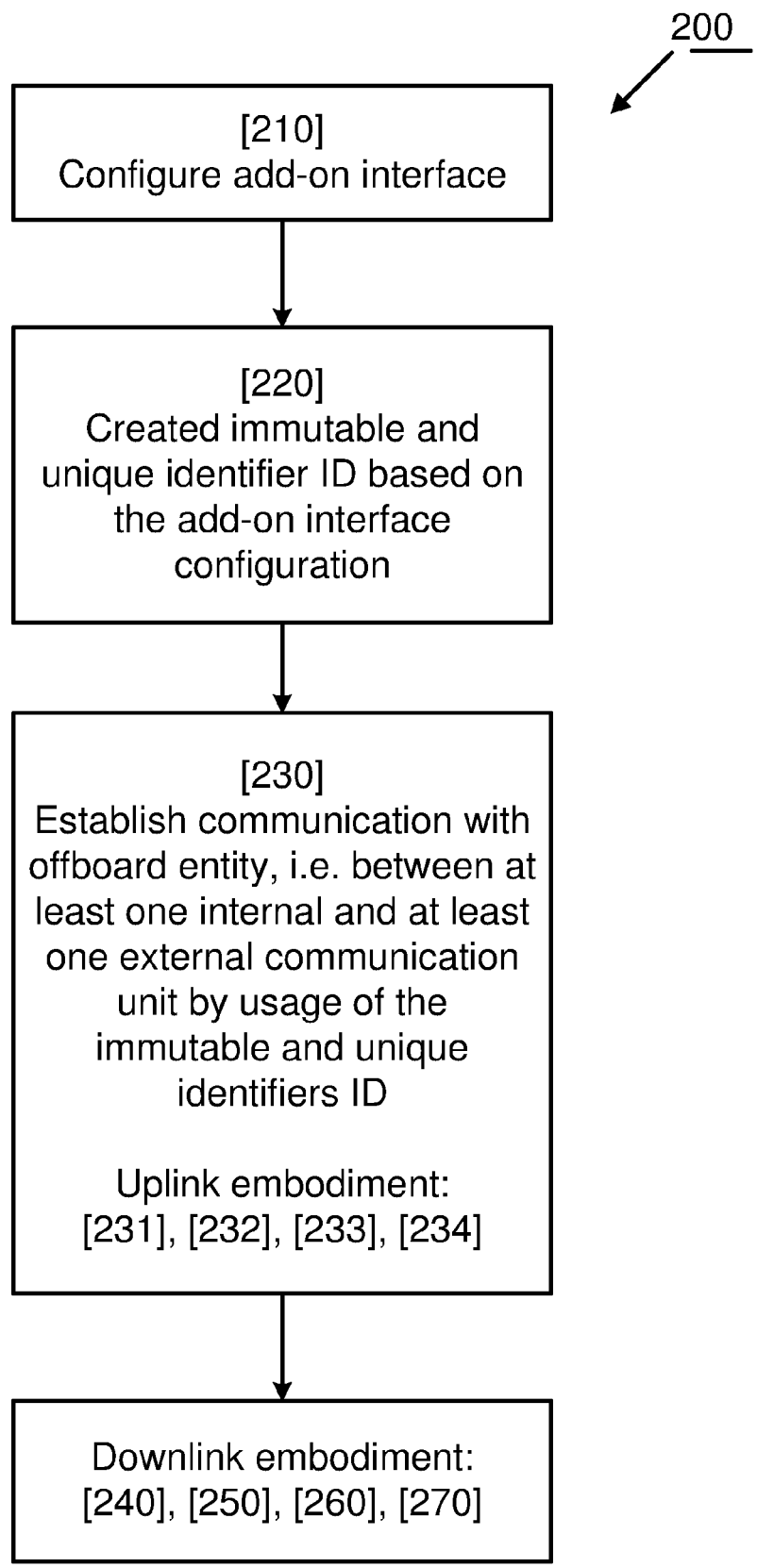
FIG. 2 shows a flow chart diagram for some embodiments of the present invention, FIG. 3 schematically illustrates one or more offboard entities and a vehicle including an add-on interface and one or more add-on and/or vehicle internal systems, FIG. 4 schematically illustrates a non-limiting example of a system, in which embodiments of the present invention may be implemented.

FIG. 2 shows a flow chart diagram for a method 200 according to an embodiment of the present invention, i.e. a method for communicating with a vehicle 100. The method steps of FIG. 2 may be performed in another order than illustrated in FIG. 2, as long as the information needed for performing a method step is available when the step is to be performed.

In a first step 210 of the method according to the present invention, the add-on interface 140 is configured by defining at least one function of the add-on interface 140, and at least a signaling format to be used by the at least one internal communication unit 116 when communication with the at least one vehicle external communication unit 161. The first step may e.g. be performed by use of a below described configuration unit/means 141.

In a second step 220 of the method according to the present invention, an immutable and unique identifier ID related to the configuration of the add-on interface 140 is created, e.g. by use of a below described creation unit/means 142.

In a third step 230 of the method according to the present invention, communicated is established with the at least one vehicle external communication unit 161 by usage of the immutable and unique identifier ID and the at least one internal communication unit 116. Thus, the immutable and unique identifier ID is used for transmitted and/or receiving information via the at least one internal 116 and the at least one external 161 communication units. The third step 230 may be performed e.g. by use of a below described communication unit/means 143.

By creating and communicating immutable and unique identifiers IDs coupled to the specific configuration of the add-on interface, knowledge of the specific add-on interface configuration may be distributed to entities wishing to communicate with the add-on interface, which facilitates establishment of a communication between one or more add-on and/or vehicle internal systems and on or more offboard entities.

Figure 3:
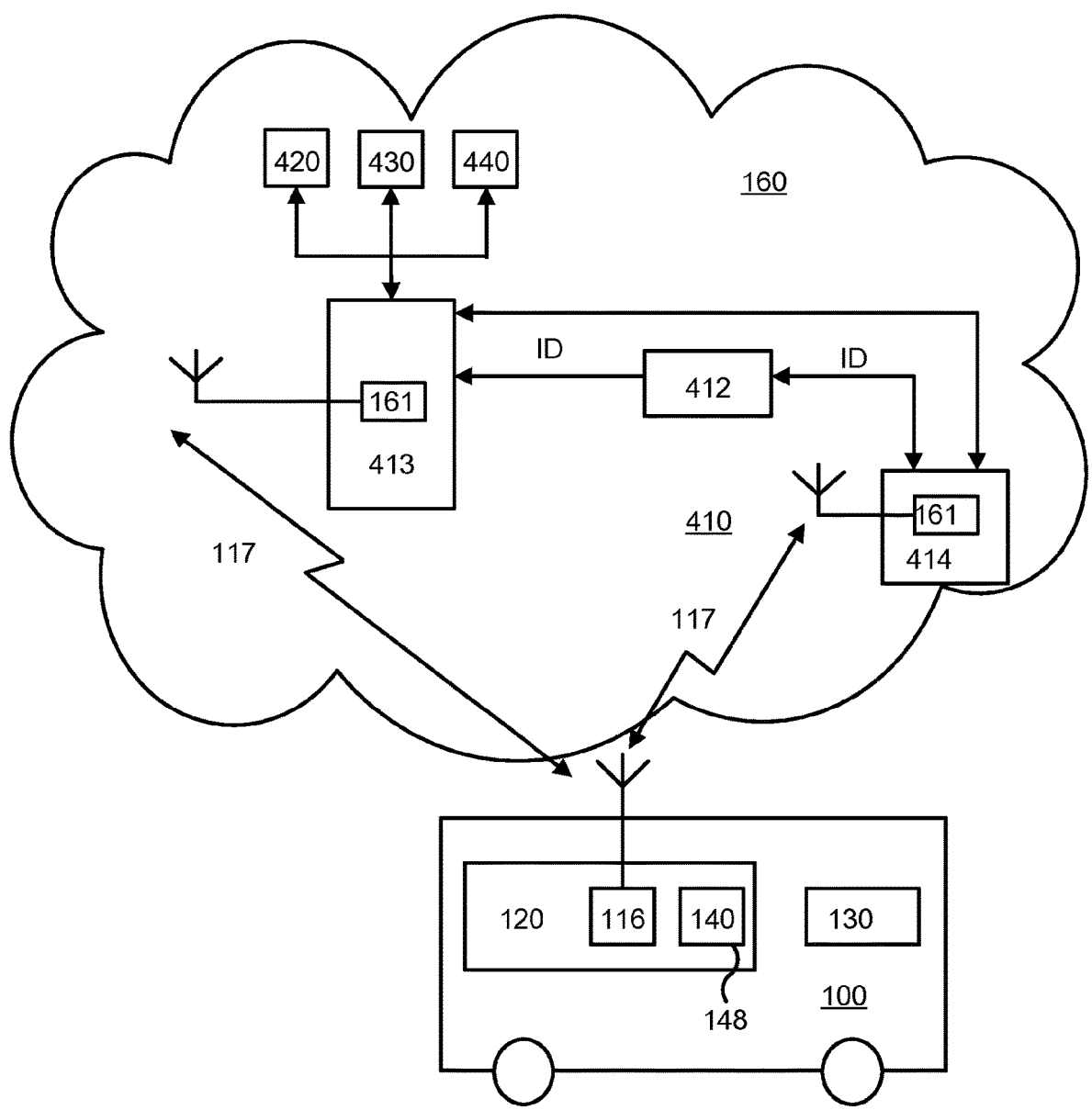

Generally, the configuration of the add-on interface may be controlled from, i.e. may be provided/inputted by, essentially anyone, e.g. by usage of an add-on interface configuration tool 414, as illustrated in FIG. 3. For example, the configuration information defining the add-on interface 140, may be provided by a final user of the vehicle 100, or by at least one other part than the manufacturer, such as e.g. a customer, wherein the at least one other part has knowledge of, e.g. has provided, manufactured, installed and/or adapted, the at least one add-on system 130. Of course, the configuration information may also be provided by the manufacturer of the vehicle. Hereby, a very flexible add-on interface is provided, and a flexible and easy addition/implementation of add-on systems to the vehicle is provided, since the communication between the add-on systems and the offboard entities is also easily managed by usage of the present invention.

Thus, one specific immutable and unique identifier ID is created 220 for each specific configuration of the add-on interface 140. According to an embodiment of the present invention, the creation 220 of the immutable and unique identifier ID includes generating of a universally unique identifier (UUID) and/or a globally unique identifier (GUID). Each of these identifiers guarantees that a safe, reliable and truly unique identifier is created, which cannot be mixed up with other identifiers. Hereby, the communication between the offboard entities and the add-on systems is reliable.

According to various embodiments of the present invention, the creation 220 of the immutable and unique identifiers IDs includes usage of a checksum number calculated based on information related to the configuration of the add-on interface 140, a time stamp number calculated based on a time instance related to the configuration of the add-on interface and/or a scrambling number generated by a random algorithm. By including one or more of these calculations when creating the immutable and unique identifiers IDs, a safe, reliable and truly unique identifier is created, which cannot be mixed up with other identifiers.

According to an embodiment or the present invention, related to uplink transmission of immutable and unique identifiers IDs and/or information, the third step of communication 230 with the at least one external communication unit 161 includes arranging 231 vehicle related information in one or more packets in accordance with the signaling format being defined by the add-on interface configuration 210. Then, the created 220 immutable and unique identifier ID is added 232 to each one of the one or more arranged packets.

The one or more packets, including both information and the immutable and unique identifier ID are then transmitted 233 from the at least one internal communication unit 116 to the at least one vehicle external communication unit 161, which is associated to, e.g. is included in an offboard entity to which the information is intended.

In the offboard entity, the information included in the packets should be detected/received/interpreted/processed, which may require that the offboard entity has knowledge of configuration of the add-on interface. For this reason, according to an embodiment of the present invention, the communicating 230 further includes transmitting 234 the immutable and unique identifier ID and information related to a corresponding configuration of the add-on interface 140 from the at least one internal communication unit 116 to the at least one vehicle external communication unit 161, which is associated with the offboard entity.

Thus, the immutable and unique identifiers IDs and information related to the corresponding add-on interface configuration may be sent separately. The immutable and unique identifiers IDs may thus be sent separately, i.e. without any further information from the add-on systems, to essentially any off-board entity, where they may be stored to be used later on, when information from one or more add-on system is sent offboard. The immutable and unique identifier ID may then be added to the information carrying packets, and may be used by the offboard entity to retrieve/fetch information related to how to receive/interpret/process information transmitted uplink from the add-on systems.

According to an embodiment of the present invention, related to downlink communication of information from at least one offboard entity to at least one add-on system of the vehicle, one or more packets are received 240 in the vehicle (100), e.g. by the add-on interface 140, the packets being received from the at least one vehicle external communication unit 161 via the at least one internal communication unit 116.

The immutable and unique identifier ID for a packet is detected 250, and based on this detection of the immutable and unique identifier ID for the packet, it is determined 260 to which vehicle system, e.g. to which add-on system 130, the packet is related, and also how the information in the packet should be interpreted.

Then, based on the determination 260 of how the information in the packet should be interpreted, the vehicle related information included in the packet is detected 270 by the, or for the system, e.g. an add-on system 130, to which the packet is related/intended.

Hereby, data/information packets including information, e.g. vehicle related information, are transmitted from one or more offboard entities to one or more add-on systems. The immutable and unique identifier ID may then identify the one or more intended recipient add-on systems, and may also indicate how to interpret the information in the packet.

According to an embodiment of the present invention, the at least one vehicle external communication unit 161 is included in an add-on interface configuration tool 414 arranged for handling the configuration of the add-on interface 140, as is illustrated in FIG. 3. Thus, the add-on interface configuration tool 414 may be one of the one or more offboard entities with which the at least one add-on system communicates, whereby the immutable and unique identifiers IDs are then sent to, and possibly being stored in, the add-on interface configuration tool after having been created. The add-on interface configuration tool may then safely and reliably communicate with the one or more add-on systems.

As illustrated in FIG. 3, according to an embodiment of the present invention, the at least one vehicle external communication unit 161 is included in a register 412 arranged for storing/including one or more of the immutable and unique identifiers ID and information related to one or more corresponding configurations of the add-on interface 140, respectively. The register 412 may be essentially any entity arranged for storing immutable and unique identifiers IDs and arranged for providing immutable and unique identifiers IDs to other entities requiring/requesting them later on.

FIG. 3 schematically illustrates a vehicle 100, as the one described in this document, including one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located offboard the vehicle, e.g. in one or more nodes 413, 414 of an add-on/bodybuilder network 410. The one or more nodes 413, 414 of the add-on/bodybuilder network 410 may be arranged e.g. in a web/internet/cloud configuration. Generally, the add-on/bodybuilder network 410 may be implemented as an internet cloud 160 related solution.

Information transmitted to and/or from the vehicle 100 may have one or more features related to one or more configured functions of the add-on interface 140 and/or related to a configured signaling format used for the connection between the at least one internal communication unit 116 and the at least one external communication unit 161, as explained above.

Generally, the offboard add-on interface configuration tool 414, a manufacturer interface entity 420, a client/user interface entity 430 and/or a diagnosis entity 440 is normally unaware of the features of the one or more add-on systems 130 and/or of the configuration of the add-on interface 140, and may therefore have difficulties with interpreting/detecting/processing/receiving information provided by the one or more add-on systems 130 to them.

The herein described immutable and unique identifier ID may be created based on, and assigned to, the specific configuration of the add-on interface functions and/or of the used signaling. The immutable and unique identifier ID may therefore be added, e.g. as included in a packet header, to information sent offboard from the one or more add-on systems 130 of the vehicle. The information may then be decoded, in a codec 413 connected e.g. to the add-on interface configuration tool 414, the manufacturer interface entity 420, the client/user interface entity 430 and/or the diagnosis entity 440. The immutable and unique identifiers IDs are used for the decoding. The immutable and unique identifier ID may, after having been previously provided by the add-on interface 140 and/or by the add-on interface configuration tool 414, be stored in a register 412 of the add-on network 410. The codec 413 may be arranged for encoding and/or decoding information transmitted from and/or to the vehicle 100, e.g. by usage of the immutable and unique identifier ID, which is then provided to the codec 413 by the register 412.

Thus, the codec 413 may detect an immutable and unique identifier ID included in a packet header of a packet including information transmitted from the vehicle 100, and may therefore be able to determine the specific configuration of the add-on interface 140, and to determine how to detect the information in the packets. Correspondingly, the immutable and unique identifier ID may also be added, e.g. in a packet header, to information transmitted from any offboard entity to the vehicle 100, e.g. to one or more add-on system of the vehicle 100. The add-on interface 140 may then, based on the immutable and unique identifier ID, easily identify to which one or more add-on systems 130 and/or one or more vehicle internal systems 120 the information is intended to be transferred, and may provide the information to that those systems, possibly after having decoded the information.

As is understood by a skilled person, FIG. 3 is for pedagogical reasons simplified and only shows some of the units/devices/entities/nodes useful for explaining the embodiments of the invention.

Figure 4:
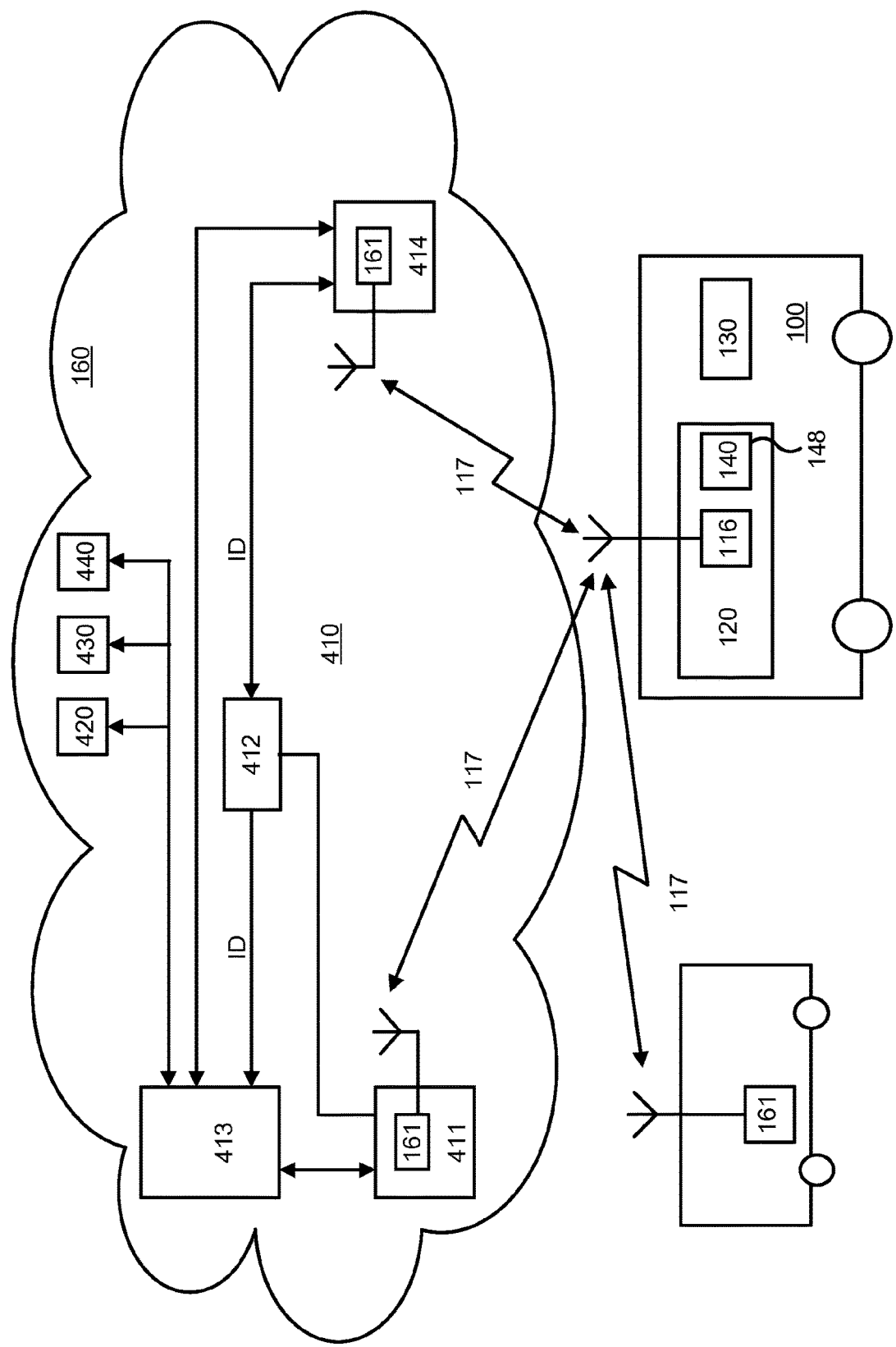

FIG. 4 schematically illustrates a system facilitating a general platform for handling vehicles including one or more add-on systems 130. As is understood by a skilled person, FIG. 4 for pedagogical reasons only shows some of the units/devices/entities/nodes in such a system. Essentially, only the units/devices/entities/nodes useful for explaining the concept are schematically illustrated in FIG. 4.

A vehicle 100, as the one described in this document, includes one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located essentially anywhere outside of the vehicle, e.g. in another vehicle and/or in one or more nodes 411, 412, 413, 414, 420, 430, 440 of an add-on/bodybuilder network 410. The one or more nodes 411, 412, 413, 414, 420, 430, 440 of the add-on/bodybuilder network 410 may be located e.g. in a web/internet/cloud related unit, in an infrastructure unit, in a server and/or in a database, as mentioned above. Generally, the add-on/bodybuilder network 410 may be implemented as an internet cloud 160 related solution. Generally, the one or more nodes 411, 412, 413, 414, 420, 430, 440 of an add-on/bodybuilder network 410 are in FIG. 4 for pedagogic reasons illustrated as separate nodes. However, these nodes may be implemented less nodes than illustrated in FIG. 4.

The add-on interface 140 utilized for the embodiments of the present invention may be an advanced and flexible interface provided with advanced logical functionality and possibilities for flexible definition of interface inputs and/or outputs. According to an embodiment, the logical functionality providable by the add-on interface 140 includes essentially any useful logical, numerical and/or mathematical operations, that may be operated on one or more signals input to the add-on interface 140. The input signals may here, according to various embodiments, include essentially any kind of signal, such as digital and/or analog signals, comprising well defined signal value levels and/or numerical signal values. Thus, the add-on interface 140 used by the embodiments of the present invention may be considerably more advanced than conventional add-on interfaces are, including e.g. processing of numerical signals, representation of physical values as numerical values, and/or performing numerical operations on the numerical values/signals.

The add-on interface 140 may also easily be configured such that it is able to interpret the signals/information being input to it from the one or more add-on systems 130, e.g. via an external control system network input, such as an external controller area network (CAN) input, of the interface/control unit 148 including the add-on interface 140. The add-on interface 140 may also easily be configured to output signals/information to the one or more add-on systems 130, via the external controller area network (CAN), such that the signals/information may be interpreted/used by the add-on systems 130. The add-on interface 140 may be arranged for converting signaling/information formats being used by the one or more add-on systems 130 to signaling/information formats being used by the one or more vehicle internal systems 120, and vice versa. Hereby, the one or more add-on systems 130 may communicate with the one or more vehicle internal systems 120, and possibly also with other systems, such as systems related to, or being included in the add-on/bodybuilder network 410.

Further, the add-on interface 140 may also be easily configured for interpreting sensor signals being provided by the one or more add-on systems 130, such that a flexibility regarding addition of sensors is achieved for the vehicle. Essentially, any type of sensor, providing any type of sensor signal having essentially any features, e.g. indicating any type of physical quantity unit, may be implemented in the one or more add-on systems 130, whereby the add-on interface 140 is configured to process the provided sensor signal accordingly. The add-on interface 140 may also be easily configured to output a processed sensor signal having suitable features to the one or more vehicle internal systems 120, such as e.g. to the instrument cluster of the driving compartment, and possibly also to other systems, such as systems/nodes related to, or being included in the add-on/bodybuilder network 410. The add-on interface 140 may for example be configured for outputting sensor signals adapted for being displayed in any suitable vehicle instrument.

The add-on network 410 may further include an add-on interface configuration tool 414, which may include an external communication unit 161 arranged for communicating with the at least one internal communication unit 116 included in the vehicle. By use of the add-on interface configuration tool 414, the add-on interface 140 may easily be configured and/or defined, as is described in this document. Information related to how the add-on interface 140 is to be configured/defined may be provided based on input to a manufacturer interface entity 420 and/or a client/user interface entity 430 by a manufacturer and/or a client/user. One or more of the manufacturer interface entity 420 and the client/user interface entity 430 may be implemented as an application (APP) program, as an interface portal, as an interface program, or as any suitable equipment arranged for presenting information and/or for receiving input of information.

An add-on/bodybuilder network 410 may be arranged, e.g. in an internet cloud 160 configuration, for communication and/or configuration of the one or more add-on systems 130, and/or for communication with the manufacturer interface entity 420 and/or the client/user interface entity 430. The add-on network 410 may include a communication node 411, which may include an external communication unit 161 arranged for communicating with the at least one internal communication unit 116 included in the vehicle.

Information transmitted to and/or from the vehicle 100 may have one or more features related to one or more configured functions of the add-on interface 140 and/or related to a configured signaling format used for the connection between the at least one internal communication unit 116 and the at least one external communication unit 161. According to some embodiments, an immutable and unique identifier ID may be created based on, and assigned to, the specific configuration of the add-on interface functions and/or of the used signaling.

Generally, the add-on interface configuration tool 414, the manufacturer interface entity 420 and/or the client/user interface entity 430 is normally unaware of the features of the one or more add-on systems 130 and/or of the configuration of the add-on interface 140. Therefore, the add-on interface configuration tool 414, the manufacturer interface entity 420 and/or the client/user interface entity 430 are often also unaware of how to interpret information provided by the one or more add-on systems 130 to them. The immutable and unique identifier ID may therefore be added, e.g. as included in a packet header, to information sent from the one or more add-on systems 130. The information may then be decoded, in a codec 413 connected to the communication node 411, by usage of this immutable and unique identifier ID. The immutable and unique identifier ID may, after having been previously provided by the add-on interface 140 and/or by the add-on interface configuration tool 414, be stored in a register 412 of the add-on network 410. The codec 413 is arranged for encoding and/or decoding information transmitted from and/or to the vehicle 100, e.g. by usage of the immutable and unique identifier ID, which is then provided to the codec 413 by the register 412.

Thus, the codec 413 may detect the immutable and unique identifier ID in a packet header of information transmitted from the vehicle 100, and may therefore be able to determine the specific configuration of the add-on interface 140 and how to detect the information in the packets. Correspondingly, the immutable and unique identifier ID may also be added, e.g. in a packet header, to information transmitted to the vehicle 100. The add-on interface 140 may then, based on the immutable and unique identifier ID, easily identify to which one or more add-on systems 130 and/or one or more vehicle internal systems 120 the information is intended to be transferred.

One or more diagnosis equipment 440 may be arranged in the add-on network 410 to process diagnosis related information. Such one or more diagnosis equipment may for example be included in the manufacturer interface entity 420 and/or in the client/user interface entity 430, or may be implemented in a separate diagnosis equipment 440. The one or more diagnosis equipment 440 is normally unaware of the features of the possibly unknown one or more add-on systems 130 and/or of the configuration of the add-on interface 140. Therefore, in order to provide a generic diagnosis system, diagnostic identifiers are created based on, and assigned to, the specific configuration of the add-on interface 140 and/or the one or more add-on systems 130. Hereby, the diagnosis equipment 440 may be able to provide a reliable diagnosis also for all add-on systems 130, also for the ones being unknown for the diagnosis equipment.

The person skilled in the art will appreciate that a method for communicating information related to a configuration of an add-on interface of a vehicle 100 according to the present invention may also be implemented in a computer program, which, when it is executed in a computer, instructs the computer to execute the method. The computer may be included in the herein described system and/or may be coupled/connected to the herein described system. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 5:
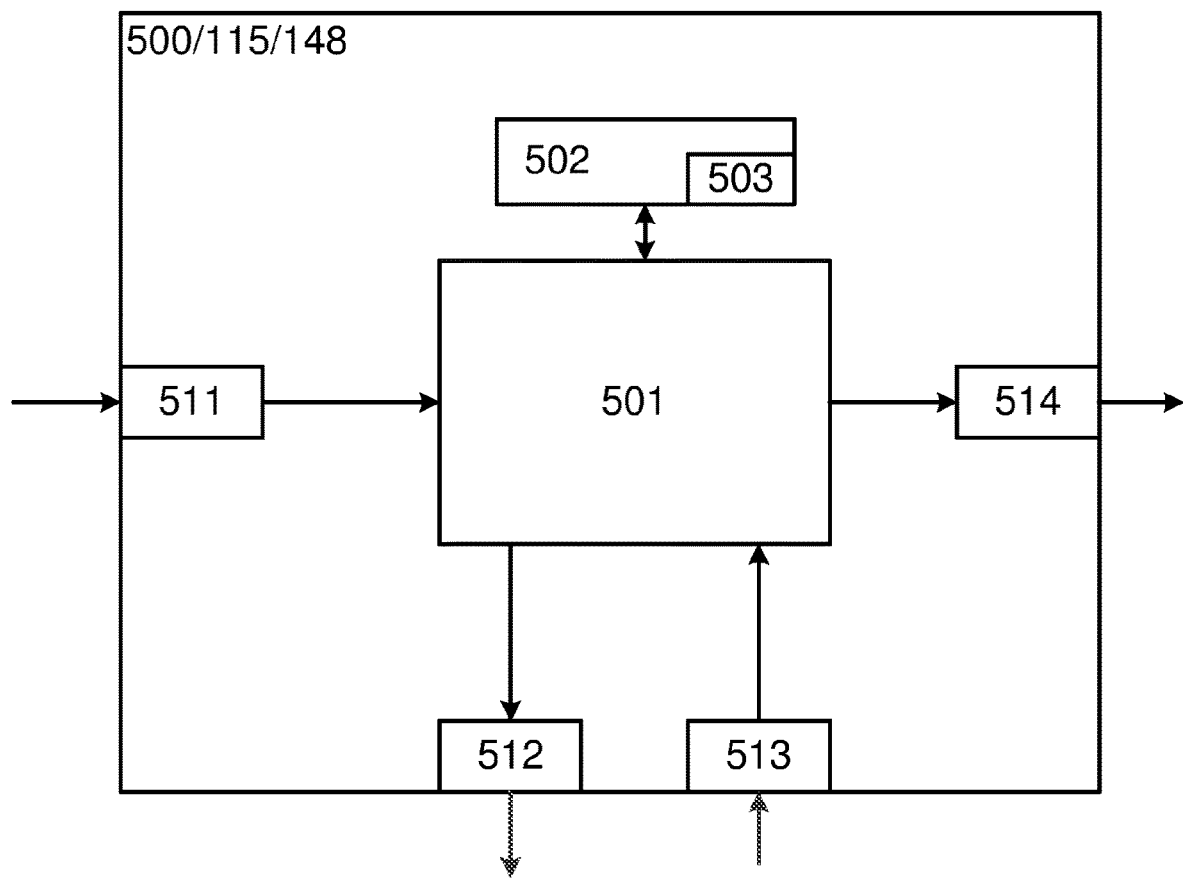
FIG. 5 is a schematic illustration of a control unit according to some embodiments of the present invention.

FIG. 5 shows in schematic representation a control unit/system/means 500/115/148. As mentioned above, the vehicle 100 may include one or more control units 115. Also, the add-on interface 140 may be implemented as a control unit. The control unit/system/means 500/115/148 comprises a computing unit 501, which may be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit/system/means 500/115/148, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit/system/means 500/115/148 is provided with devices 511, 512, 513, 514 for receiving and transmitting input and output signals. These input and output signals may comprise waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems within or outside the vehicle 100.

Each of the connections to the devices for receiving and transmitting input and output signals can be comprise one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 501 and that the above-stated memory may be constituted by the memory unit 502.

Control systems in modern vehicles commonly comprise communication bus systems including one or more communication buses for linking a number of electronic control units (ECU's), or controllers, and various components located on the vehicle. Such a control system may comprise a large number of control units/means and the responsibility for a specific function can be divided amongst more than one control unit/means. Vehicles of the shown type thus often comprise significantly more control units/means than are shown in FIGS. 1 and 5, which is well known to the person skilled in the art within this technical field.

In the shown embodiment, the present invention is implemented in the control unit/system/means 500/115/148. The invention can also, however, be implemented wholly or partially in one or more other control units/systems/means already present in the vehicle, or in some control unit/system/means dedicated to the present invention.

According to an aspect of the invention, an interface control unit 148 arranged for communicating with a vehicle 100 is provided.

The control unit 148 includes a configuration unit/means 141, arranged for configuring 210 the add-on interface 140 by defining:—at least one function of the add-on interface 140; and—at least a signaling format to be used by the at least one internal communication unit 116 for the communication with the at least one vehicle external communication unit 161, as described above.

The control unit 148 further includes creation unit/means 142, arranged for creating 220, an immutable and unique identifier ID related to the configuration of the add-on interface 140, as described above.

The control system 148 also includes a communication unit/means 143, arranged for communicating 230, by usage of the at least one internal communication unit 116 and the immutable and unique identifier ID, with the at least one vehicle external communication unit 161, as described above.

By activation of the above described configuration unit/means 141, creation unit/means 142, and communication unit/means 143, information related to a configuration of an add-on interface and/or other information may be communicated, which has the above-mentioned advantages.

Here and in this document, units/means are often described as being arranged for performing steps of the method according to the invention. This also includes that the units/means are designed to and/or configured to perform these method steps.

The at least one control unit/system/means 148 is in FIG. 1 illustrated as including separately illustrated units/means 141, 142, 143. Also, the control system/means 140 may include or be coupled to e.g. other device/means 115. These means/units/devices 141, 142, 143, 148, 115 may, however, be at least to some extent logically separated but implemented in the same physical unit/device. These means/units/devices 141, 142, 143, 148, 115 may also be part of a single logic unit which is implemented in at least two different physical units/devices. These means/units/devices 141, 142, 143, 148, 115 may also be at least to some extent logically separated and implemented in at least two different physical means/units/devices. Further, these means/units/devices 141, 142, 143, 148, 115 may be both logically and physically arranged together, i.e. be part of a single logic unit which is implemented in a single physical means/unit/device. These means/units/devices 141, 142, 143, 148, 115 may for example correspond to groups of instructions, which can be in the form of programming code, that are input into, and are utilized by at least one processor when the units/means are active and/or are utilized for performing its method step, respectively. It should be noted that the control unit/system/means 148 may be implemented at least partly within the vehicle 100 and/or at least partly outside of the vehicle 100, e.g. in a server, computer, processor or the like located separately from the vehicle 100.

As mentioned above, the units 141, 142, 143 described above correspond to the claimed means 141, 142, 143 arranged for performing the embodiments of the present invention, and the present invention as such.

The control system according to the present invention can be arranged for performing all of the above, in the claims, and in the herein described embodiments method steps. The system is hereby provided with the above described advantages for each respective embodiment.

A skilled person also realizes that the above described system may be modified according to the different embodiments of the method of the present invention. The present invention is also related to a vehicle 100, such as a truck, a bus or a car, including the herein described control unit 148 arranged for communicating with a vehicle 100.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the above described embodiments. Instead, the present invention relates to, and encompasses all different embodiments being included within the scope of the independent claims.

The invention claimed is:

1. A method for communicating with a vehicle, said vehicle comprising: at least one vehicle internal system in the form of at least one of an engine, a clutch, or a gearbox; at least one add-on system in the form of a bodywork provided by a body-builder, said add-on system being arranged in said vehicle after said vehicle is produced by a manufacturer; and at least one vehicle internal communication unit configured for communication with at least one off-board vehicle external communication unit, wherein the method comprises:

configuring an add-on interface, the add-on interface being arranged in said vehicle as an interface between the at least one vehicle internal system and the at least one add-on system, by defining: at least one function of said add-on interface, and at least a signaling format to be used by said at least one vehicle internal communication unit for said communication with said at least one off-board vehicle external communication unit;

creating an immutable and unique identifier ID, wherein such immutable and unique identifier ID is based on a specific configuration of the add-on interface; and communicating, using said at least one vehicle internal communication unit and said immutable and unique identifier ID, with said at least one off-board vehicle external communication unit.

2. The method as claimed in claim 1, wherein said communicating comprises:

arranging vehicle related information in one or more packets in accordance with said signaling format;

adding said immutable and unique identifier ID to each one of said one or more packets; and transmitting said one or more packets to said at least one off-board vehicle external communication unit.

3. The method as claimed in claim 1, wherein said communicating comprises: transmitting said immutable and unique identifier ID and information related to a corresponding configuration of said add-on interface to said at least one off-board vehicle external communication unit.

4. The method as claimed in claim 1, including for each one of said one or more packets:

receiving said packet from said at least one off-board vehicle external communication unit;

detecting said immutable and unique identifier ID for said packet;

determining, based on said detected immutable and unique identifier ID for said packet: to which system said packet is related; and how the information in said packet should be interpreted; and detecting, based on the determined interpretation, vehicle related information included in said packet.

5. The method as claimed in claim 1, wherein said at least one off-board vehicle external communication unit is associated with one or more of:

at least one web and/or internet related unit;
at least one internet cloud related unit;
at least one infrastructure unit;
at least one external communication unit included in at least one other vehicle;
at least one server;
at least one database;
at least one processor; and/or
at least one computer.

6. The method as claimed in claim 1, wherein said at least one off-board vehicle external communication unit is comprised in one or more of:

an add-on interface configuration tool configured for handling the configuration of the add-on interface; and/or a register storing one or more of said immutable and unique identifiers ID and information related to one or more corresponding configurations of said add-on interface, respectively.

7. The method as claimed in claim 1, wherein one immutable and unique identifier ID is created for each specific configuration of said add-on interface.

8. The method as claimed in claim 1, wherein said creating of said immutable and unique identifier ID includes generating of a universally unique identifier (UUID) and/or a globally unique identifier (GUID).

9. The method as claimed in claim 1, wherein:
said at least one vehicle internal communication unit is included in a control system network of said vehicle; and
said at least one add-on system is connected to an external control system network input of an interface control unit including said add-on interface.

10. The method as claimed in claim 1, wherein said at least one vehicle internal communication unit is configured for communicating with said at least one off-board vehicle external communication unit using one or more of:
a wireless communication standard connection; and/or
a wired connection.

11. The method as claimed in claim 10, wherein defining said at least one function of said add-on interface and of said at least a signaling format is based on input provided by one or more of:
a final user of said vehicle;
at least one other part than said manufacturer, said at least one other part having knowledge of said at least one add-on system; and/or
said manufacturer.

12. The method as claimed in claim 1, wherein said at least one add-on system is a system provided by at least one other part than said manufacturer of said vehicle.

13. The method as claimed in claim 1, wherein creating the immutable and unique identifier ID comprises creating the immutable and unique identifier ID based on the specific configuration of the add-on interface where the specific configuration relates to at least one or both of: at least one function of said add-on interface, and/or the signaling format used by said at least one vehicle internal communication unit for said communication with said at least one off-board vehicle external communication unit.

14. The method as claimed in claim 1, wherein creating the immutable and unique identifier ID comprises creating the immutable and unique identifier ID to include a checksum number calculated based on information related to the configuration of the add-on interface and at least one of: a time stamp number calculated based on a time instance related to the configuration of the add-on interface, and/or a scrambling number generated by a random algorithm.

15. A computer program product comprising computer program code stored on a non-transitory computer-readable medium, said computer program product used for communicating with a vehicle, said vehicle comprising: at least one vehicle internal system in the form of at least one of an engine, a clutch, or a gearbox; at least one add-on system in the form of a bodywork provided by a body-builder, said add-on system being arranged in said vehicle after said vehicle is produced by a manufacturer; and at least one vehicle internal communication unit configured for communication with at least one off-board vehicle external communication unit, said computer program code comprising computer instructions to cause one or more control units to perform the following operations:
configuring an add-on interface, the add-on interface being arranged in said vehicle as an interface between the at least one vehicle internal system and the at least one add-on system, by defining: at least one function of said add-on interface, and at least a signaling format to be used by said at least one vehicle internal communication unit for said communication with said at least one off-board vehicle external communication unit;
creating an immutable and unique identifier ID, wherein such immutable and unique identifier ID is based on a specific configuration of the add-on interface; and
communicating, using said at least one vehicle internal communication unit and said immutable and unique identifier ID, with said at least one off-board vehicle external communication unit.

16. A control unit arranged with a vehicle, said vehicle comprising:
at least one vehicle internal system in the form of at least one of an engine, a clutch, or a gearbox; at least one add-on system in the form of a bodywork provided by a body-builder, said add-on system being arranged in said vehicle after said vehicle is produced by a manufacturer; and at least one vehicle internal communication unit configured for communication with at least one off-board vehicle external communication unit, said control unit configured for:
configuring an add-on interface, the add-on interface being arranged in said vehicle as an interface between the at least one vehicle internal system and the at least one add-on system, by defining: at least one function of said add-on interface; and at least a signaling format to be used by said at least one vehicle internal communication unit for said communication with said at least one off-board vehicle external communication unit;
creating an immutable and unique identifier ID, wherein such immutable and unique identifier ID is based on a specific configuration of the add-on interface; and
communicating, using said at least one vehicle internal communication unit and said immutable and unique identifier ID, with said at least one off-board vehicle external communication unit.

* * * * *